United States Patent [19]

Stanley

[11] Patent Number: 5,332,526
[45] Date of Patent: Jul. 26, 1994

[54] MULTI-PURPOSE PAINT AND VARNISH STRIPPER

[76] Inventor: Donald E. Stanley, 2435 Wheeler Rd., Bay City, Mich. 48706

[21] Appl. No.: 31,337

[22] Filed: Mar. 15, 1993

[51] Int. Cl.$^5$ .......................... B08B 7/00; C09D 9/04; C11D 7/26; C11D 7/32
[52] U.S. Cl. .................................. 252/542; 252/153; 252/162; 252/170; 252/171; 252/DIG. 8; 134/38
[58] Field of Search ............... 252/153, 162, 170, 171, 252/542, DIG. 8; 134/38

[56] References Cited

U.S. PATENT DOCUMENTS

| | | | |
|---|---|---|---|
| 4,120,810 | 10/1978 | Palmer | 252/153 |
| 4,780,235 | 10/1988 | Jackson | 252/170 |
| 4,836,950 | 6/1989 | Madsen et al. | 252/153 |
| 5,006,279 | 4/1991 | Grobbel et al. | 252/542 |
| 5,015,410 | 5/1991 | Sullivan | 252/166 |
| 5,024,780 | 6/1991 | Leys | 252/162 |
| 5,035,829 | 7/1991 | Suwala | 252/170 |
| 5,089,164 | 2/1992 | Stanley | 252/162 |
| 5,124,062 | 6/1992 | Stevens | 252/162 |
| 5,154,848 | 10/1992 | Narayanan et al. | 252/162 |
| 5,188,675 | 2/1993 | Dormon-Brailsford | 134/4 |

FOREIGN PATENT DOCUMENTS 389829 10/1990 European Pat. Off. .
2230791 10/1990 United Kingdom .

*Primary Examiner*—Linda Skaling
*Attorney, Agent, or Firm*—Merlin B. Davey

[57] ABSTRACT

This invention provides a paint stripping composition comprising N-methyl-2-pyrrolidone and lower alkyl ethers of propylene glycol and dipropylene glycol. The composition does not include any toluene, halogenated hydrocarbons, acids, caustics or waxes and is not harmful to a wide variety of substrates.

8 Claims, No Drawings

MULTI-PURPOSE PAINT AND VARNISH STRIPPER

BACKGROUND OF THE INVENTION

This invention relates to compositions and methods for chemically removing paint and varnish from wood, metal, glass, fiberglass and many plastics surfaces. Prior to the realization of the various health hazards caused by halogenated hydrocarbon chemicals, the cornerstone of the paint stripping industry was methylene chloride. With the discovery of the hazards connected with the use of such materials, many proposals have been made for paint and varnish stripping compositions that do not include halogenated hydrocarbons. Hitherto, the most successful of these developments required the use of acids, thereby creating the problems of neutralization and/or harming the surface to be stripped. A recent patent, U.S. Pat. No. 4,965,010 to Ralph R. Swett, proposes to solve the problem by employing approximately equal parts of methyl ethyl ketone, methyl alcohol, toluene and acetone. The volatile nature of such compositions can create severe ventilation problems when working in confined spaces and further requires the use of large amounts of thickeners to assist in keeping the stripping compositions in place long enough to do a thorough stripping job.

U.S. Pat. No. 5,089,164 describes and claims multi-purpose paint and varnish strippers comprising N-methyl-2-pyrrolidone, toluene, lower aliphatic alcohols and ketones, propylene glycol, mineral spirits, surfactants and thickeners. While such compositions are very effective paint and varnish strippers, it has been found that they are not environmentally acceptable due to the suspected carcinogenic activity of toluene.

SUMMARY OF THE INVENTION

This invention provides an improved composition and method for stripping paint or varnish from a variety of substrates such as, for example, wood, metal, glass, fiberglass and plastics which comprises at least one member of the group consisting of N-methyl-2-pyrrolidone and dipropylene glycol dimethyl ether, ethyl 3-ethoxypropionate, lower alipathic ketones, surfactants and at least one member of the group consisting of lower alkyl ethers of propylene glycol and dipropylene glycol wherein the lower alkyl groups comprise 1 to 4 carbon atoms. Odorants, such as d-limonene and thickeners, may be added if desired. The compositions of this invention have improved stripping efficiency, improved flash points, reduced evaporation and improved environmental safety. They are safe to handle and do not harm the surface to be stripped.

DETAILED DESCRIPTION OF THE INVENTION

The compositions of this invention are preferably prepared by first blending the desired amounts of N-methyl-2-pyrrolidone or dipropylene glycol dimethyl ether and the lower alkyl ethers of propylene glycol and dipropylene glycol. After blending or thoroughly mixing the N-methyl-2-pyrrolidone and lower alkyl ethers of propylene glycol and dipropylene glycol, the remaining ingredients comprising ethyl 3-ethoxypropionate, acetone, surfactants such as Igepal (Reg. TM) CO-730 (nonylphenoxypoly(ethyleneoxy)ethanol), odorants such as, for example, d-limonene and thickeners, if desired, such as, for example, hydroxypropyl cellulose, and others known in the art, can be added and mixed as desired. When properly mixed, these components remove the paint and/or varnish without the development of air bubbles which serve to prevent the stripping composition from penetrating all layers of the paint or varnish to be removed. As used herein, propylene glycol refers to both the 1,2 and 1,3 hydroxy substitution on the propylene moiety.

Compositions in accordance with the present invention advantageously comprise the following materials and amounts, the weight percentages all being based on the total weight of the composition:

|  | Wt. % |
|---|---|
| Mixture of propylene glycol n-butyl ether (80%) and dipropylene glycol dimethyl ether (20%) | 2–35 |
| N-methyl-2-pyrrolidone | 10–25 |
| Ethyl 3-ethoxypropionate | 5–10 |
| Isopropyl alcohol | 5–15 |
| Lower aliphatic ketones | 10–25 |
| Surfactant | 1–5 |
| Odorant | 1–5 |
| Thickener | 0–5 |

A preferred composition in accordance with the present invention comprises the following materials and approximate amounts, the weight percentages all being based on the total weight of the composition:

|  | Wt. % |
|---|---|
| N-methyl-2-pyrrolidone | 20 |
| Mixture of propylene glycol n-butyl ether (80%) and dipropylene glycol dimethyl ether (20%) | 20 |
| Mixture of 1-Methoxy-2-propanol (98%) and 2-Methoxy-1-propanol (2%) | 10 |
| Ethyl 3-ethoxypropionate | 10 |
| Isopropyl alcohol | 10 |
| Acetone | 25 |
| Igepal (Reg. TM) CO-730 | 2 |
| Odorant | 4 |

If a semi-paste is desired, a thickener may be added in an amount of about 4% and the amount of acetone decreased accordingly.

In the most preferred compositions, hydroxypropyl cellulose is employed as the thickener and d-limonene is a preferred odorant.

The compositions of this invention are environmentally safe, do not burn the skin, do not raise the grain or fur the wood, do not harm veneers, patina, glue joints, glass, fiberglass, most plastics or metal and do not require neutralizing or a water wash. Because of their reduced volatility, the compositions of this invention have increased effectiveness without requiring excessive amounts of thickeners. Further, a wax sealer is not needed to reduce evaporation. Wax sealers generally leave a residue or film on stripped surfaces and thus interfere with finishes that are to be re-applied.

The compositions of the invention can be applied as a liquid or can be thickened sufficiently to form a semi-paste like product. No acids or caustics are employed and no halogenated hydrocarbons. The compositions will soften most paints and varnishes in from 1 to 3 minutes, at which time the residue can be readily removed with a scraper or a rag or brush moistened with further stripping composition. Urethane finishes require a somewhat longer time to soften and the use of the semi-paste formulation rather than the liquid formulation is suggested. These compositions will stay moist for up to 24 hours without leaving an oily residue.

Various modifications may be made in the present invention without departing from the spirit or scope thereof, as will be understood by those skilled in the art.

I claim:

1. An environmentally acceptable composition for stripping paint and varnish consisting essentially of from 10 to 25 weight percent N-methyl-2-pyrrolidone, from 2 to 35 weight percent of a mixture of propylene glycol n-butyl ether and dipropylene glycol dimethyl ether, from 5 to 10 weight percent of ethyl 3-ethoxypropionate, from 5–15 weight percent of isopropyl alcohol, from 10–25 weight percent of a lower aliphatic ketone, from 1 to 5 weight percent of a surfactant and from 1 to 5 weight percent of an odorant.

2. Composition of claim 1 consisting essentially of from 2–10 weight percent of a mixture of 80 weight percent propylene glycol n-butyl ether and 20 weight percent dipropylene glycol dimethyl ether based on the total weight of the stripping composition.

3. Composition of claim 1 further including from 5–15 weight percent of a mixture of 98 weight percent 1-methoxy-2-propanol and 2 weight percent of 2-methoxy-1-propanol based on the total weight of the stripping composition.

4. Composition of claim 1 further including from 2–5 weight percent of a thickener.

5. Composition of claim 4 wherein the thickener is hydroxypropyl cellulose.

6. Composition of claim 1 wherein the surfactant comprises from 1–5 weight percent based on the weight of the total composition of nonylphenoxypoly(ethyleneoxy)ethanol.

7. Method for stripping paint and varnish from surfaces coated with said paint or varnish which comprises applying the composition of claim 1 to said painted or varnished surface and thereafter removing the softened paint or varnish.

8. Method for stripping paint and varnish from surfaces coated with said paint or varnish which comprises applying the composition of claim 6 to said painted or varnished surface and thereafter removing the softened paint or varnish.

* * * * *